United States Patent [19]
Sheem

[11] Patent Number: 5,515,464
[45] Date of Patent: May 7, 1996

[54] OPTICAL FIBER INTERCONNECTIONS USING SELF-ALIGNED CORE-EXTENSIONS

[76] Inventor: Sang K. Sheem, P.O. Box 2141, Livermore, Calif. 94551-2141

[21] Appl. No.: 155,553

[22] Filed: Nov. 22, 1993

Related U.S. Application Data

[63] Continuation-in-part of Ser. No. 908,466, Jul. 6, 1992, Pat. No. 5,287,424.

[51] Int. Cl.⁶ ................................................. G02B 6/30
[52] U.S. Cl. ........................ 385/49; 385/14; 385/31; 385/39; 385/43; 385/50; 385/131; 385/132; 385/52
[58] Field of Search ........................... 385/14, 15, 31, 385/43, 49, 50, 129, 130, 131, 132, 39, 51, 52, 33

[56] References Cited

U.S. PATENT DOCUMENTS

| 5,015,059 | 5/1991 | Booth et al. ............................ 385/49 X |
| 5,046,808 | 9/1991 | Chang ..................................... 385/14 |
| 5,071,215 | 12/1991 | Hockaday ............................... 385/49 |
| 5,097,524 | 3/1992 | Wasserman et al. ................... 385/73 |
| 5,280,550 | 1/1994 | Parriaux et al. ........................ 385/50 |
| 5,287,424 | 2/1994 | Sheem et al. ........................... 385/39 |
| 5,323,476 | 6/1994 | Mueller et al. ......................... 385/43 |

FOREIGN PATENT DOCUMENTS

| 0318267 | 5/1989 | European Pat. Off. ............ 385/49 X |
| 4142850 | 6/1993 | Germany ............................ 385/49 X |
| 60-14206 | 1/1985 | Japan ................................. 385/49 X |
| 62-17711 | 1/1987 | Japan ................................. 385/49 X |
| 2-257110 | 10/1990 | Japan ................................. 385/49 X |
| WO92/08154 | 5/1992 | WIPO ................................. 385/49 X |

OTHER PUBLICATIONS

Nutt et al., "Fiber–to–Waveguide Coupling . . . ", Optics Lett., vol. 9, No. 10, Oct. 1984, pp. 463–465.

Primary Examiner—Brian Healy

[57] ABSTRACT

An optical fiber interconnecting structure for connecting an optical fiber to an optical channel waveguide, in which a channel waveguide is extended collinearly by a hollow channel with sectional area and shape substantially identical to those for the channel waveguide. An optical fiber is laid collinearly with the channel, and a core-extension is formed at the end facet of the optical fiber to form a gradual and smooth optical transition to the channel waveguide. The channel waveguide may be tapered out to have a substantially larger sectional area at the far end so as to ease the optical interconnection.

22 Claims, 16 Drawing Sheets

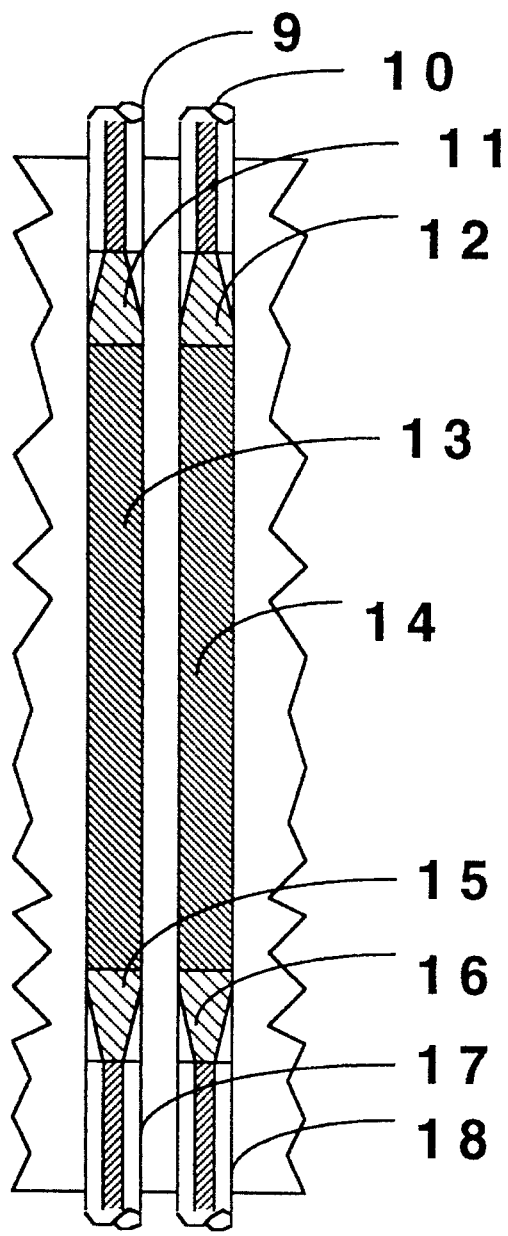
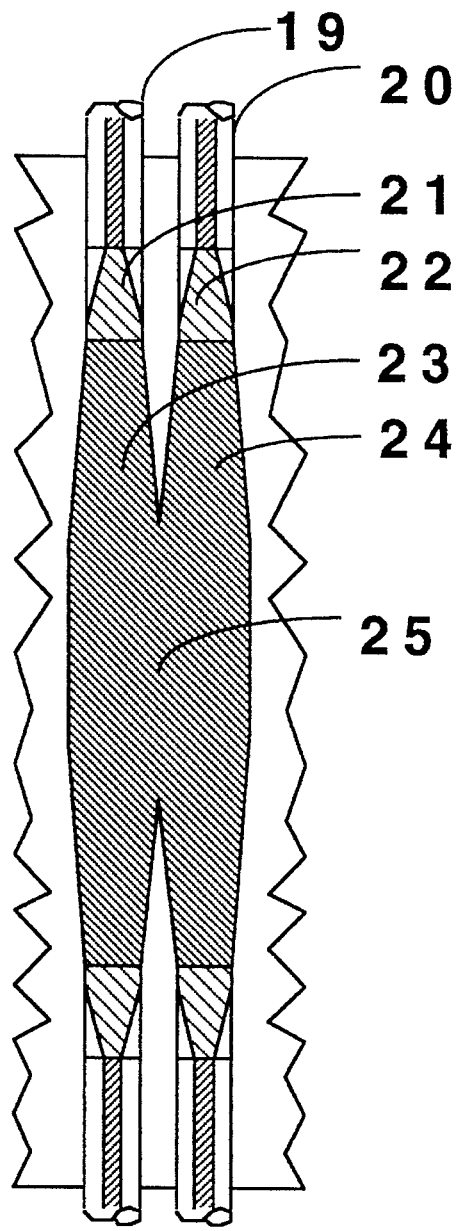
FIG. 12  FIG. 13

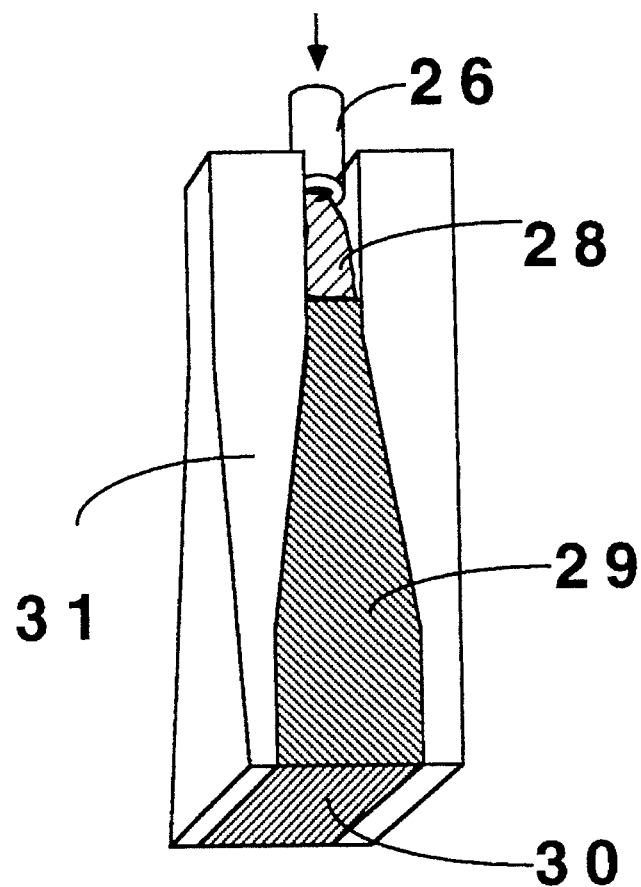
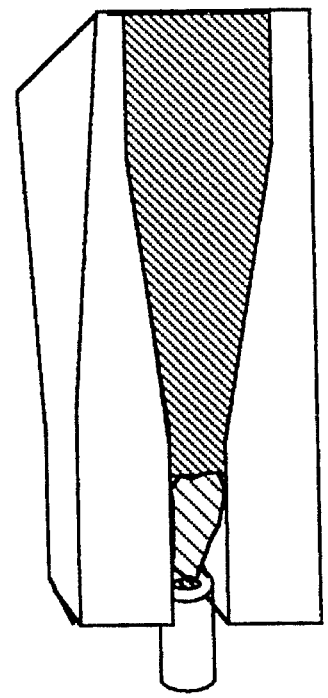
FIG. 16

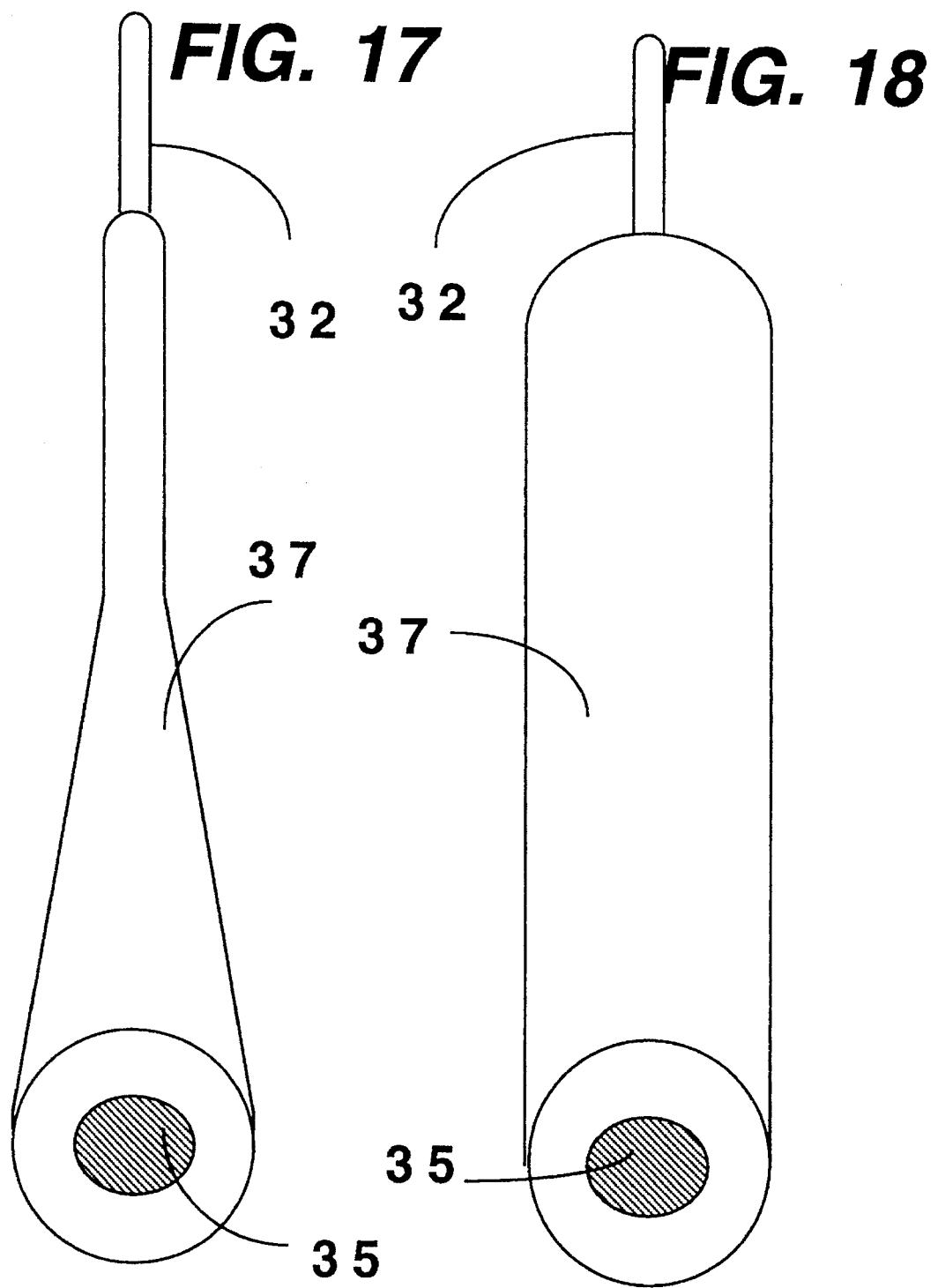

OPTICAL FIBER INTERCONNECTIONS USING SELF-ALIGNED CORE-EXTENSIONS

CROSS REFERENCE TO RELATED APPLICATION

This application is a continuation-in-part of applicant's prior application Ser. No. 07/908,466, filed Jul. 6, 1992, for which U.S. Pat. No. 5,287,424 has been issued on Feb. 15, 1994, and which is incorporated herein by reference as if set forth in full. This patent is termed the "parent patent".

BACKGROUND OF THE INVENTION

The most common optical waveguide is the fiber with a round-shaped core supported by a round-shaped cladding. The next common optical waveguide is a planarized waveguide in which light-guiding channels are fabricated near the surface of an usually right-angled optical substrate. In the planarized waveguide the light-guiding core is often called optical channel waveguide. Many of the useful optical functions, such as light modulation, wavelength multiplexing, switching, and coupling may be realized on planarized waveguides.

Guided light resides mostly inside the core or the channel. The sectional dimension of the fiber core is typically less than ten microns (0.01 mm) in single-mode fibers, and usually less than 200 microns even in the multimode fibers. The sectional dimension for channel waveguide is in the same range. Accordingly, connecting and coupling (mixing) of light between two or more fibers present enormous technical challenge. As a result, the prices for connectors and couplers for optical fibers are quite expensive, especially when compared to the counterpart components for microwave cables. Since the connectors and the couplers are among the most frequently used components in the optical fiber communication, the high component price has impeded the expansion of the optical fiber communication into the broader applications, such as picture-phone, computer networking, and cable television.

The parent patent referred to above has been dealing mainly with the fiber couplers for dividing and combining lights among many optical fibers laid in parallel. The present continuation-in-part application instead deals with optical fiber connectors for transferring a light from one optical fiber to another optical fiber in one-to-one relationship, and also between an optical fiber and a channel waveguide in the one-to-one relationship.

Optical fiber connector is one of the key components in fiber optics, especially in the optical fiber communication. The cost becomes the critical issue when the applications come close to end-users, such as interconnecting computer networks. The existing optical fiber connectors are very expensive and intricate for such applications. Also such applications will require multi-fiber array connectors, the counterpart of multipin connectors for electronic cables. Array connectors minimize connector space, per-connection cost, and overall connection time. Technology for such multi-fiber array connectors is in its infancy at best at the present time, and the price is impractically high.

In general, the connection between fibers becomes easier when light beam is enlarged in size in the mating plane. When the beam is enlarged, the alignment tolerance becomes relaxed, while the angular tolerance becomes more stringent. For example, Wasserman and Gibolar show in U.S. Pat. No. 5,097,524 a connector embodiment that employs lenses to expand light beam. Moslehi et. al. describes in Optics Letters, Volume 14, Number 23, on page 1327, a fiber optic connection based on expanded-beam optics. Hussey and Payne describes in Electronics Letters, Volume 24, Number 1, on page 14, a fiber-horn beam expander. However these techniques still require critical alignment between fibers and the beam-expanding elements. Also, these prior arts are for single fiber connection, and do not lend themselves to array connection.

Another important fiber optic technology is connection between an optical fiber and a channel waveguide. Currently, channel waveguides are patterned on or near the flat top surface of a bulk optical substrate using photo-lithography or other advanced techniques such as electron-beam or laser-beam writing. In most of the applications, a channel waveguide needs to be connected to an optical fiber in one-to-one, end-butt fashion. To make this connection, the end of the channel waveguide should be cut flat and right-angled with respect to the waveguide plane, and then polished with the fabrication tolerance in the order of a fraction of the optical wavelength while keeping the edge sharply right-angled within one or two microns from the substrate surface. Then an optical fiber with a cleaved facet is brought against the such-prepared end facet of the channel waveguide. The lateral alignment between the optical fiber core and the channel waveguide should be made within a few microns or less. Then a cementing material is applied to the butted region. The alignment often deteriorates while the cement is being cured due to the volume change and shift, causing connector loss. Even with the perfect alignment, the shape mismatch between the round fiber core and the largely square-shaped channel waveguide causes substantial connector loss. Overall, a fiber-to-channel connection is a very expensive fabrication step. This is another reason why the fiber optics has not been able to penetrate into the wider consumer market despite of the enormous potential benefits.

SUMMARY OF THE PRESENT INVENTION

Accordingly, it is the primary objective of the present invention to devise a novel optical interconnection embodiment that resolves the technical difficulties in optical fiber connectors.

It is an accompanying objective of the present invention to devise a novel optical interconnection embodiment for arrayed fiber connectors.

It is the general objective of the present invention to make the cost of optical fiber connection low enough even for the low-density, low-end optical fiber communication applications.

The basic connection element of the present invention comprises a single optical fiber having a core and a cladding, a core-extension as disclosed in the referenced parent patent, and a channel waveguide with a hollow end-section in which the core-extension is placed. As in the parent patent, the core-extension is built upon the core end facet of the fiber in a shape of the diverging horn-like structure. In the present invention the sectional area of the channel waveguide is always larger than that of the core, and the fiber-to-channel waveguide connection is made through the core-extension. Accordingly, connection between the fiber and the channel waveguide is self-aligned. The channel waveguide may performs one of the various functions, such as modulation, wavelength multiplexing, switching, coupling, and connection. In an embodiment for fiber-to-fiber connection, the channel waveguide is tapered along the length to have a substantially large sectional area.

3

BRIEF DESCRIPTION OF THE DRAWINGS

FIG. 12 shows the same as that of FIG. 3, except that there are two units of the optical fiber interconnection embodiment, instead of one, forming an array on the same substrate.

FIG. 13 shows the same as that of FIG. 12, except that the channel waveguides are tapered out to be joined together, forming a light coupler.

FIG. 16 shows in a schematic manner a perspective view of a pair of optical fiber connectors containing the tapered channel waveguide shown in FIG. 14.

FIG. 17 shows in a schematic manner a perspective view of one type of optical fiber connector the sectional view of which is as shown in FIG. 15.

FIG. 18 shows in a schematic manner a perspective view of another type of optical fiber connector with the sectional view as shown in FIG. 15.

DETAILED DESCRIPTION

Figure 1:
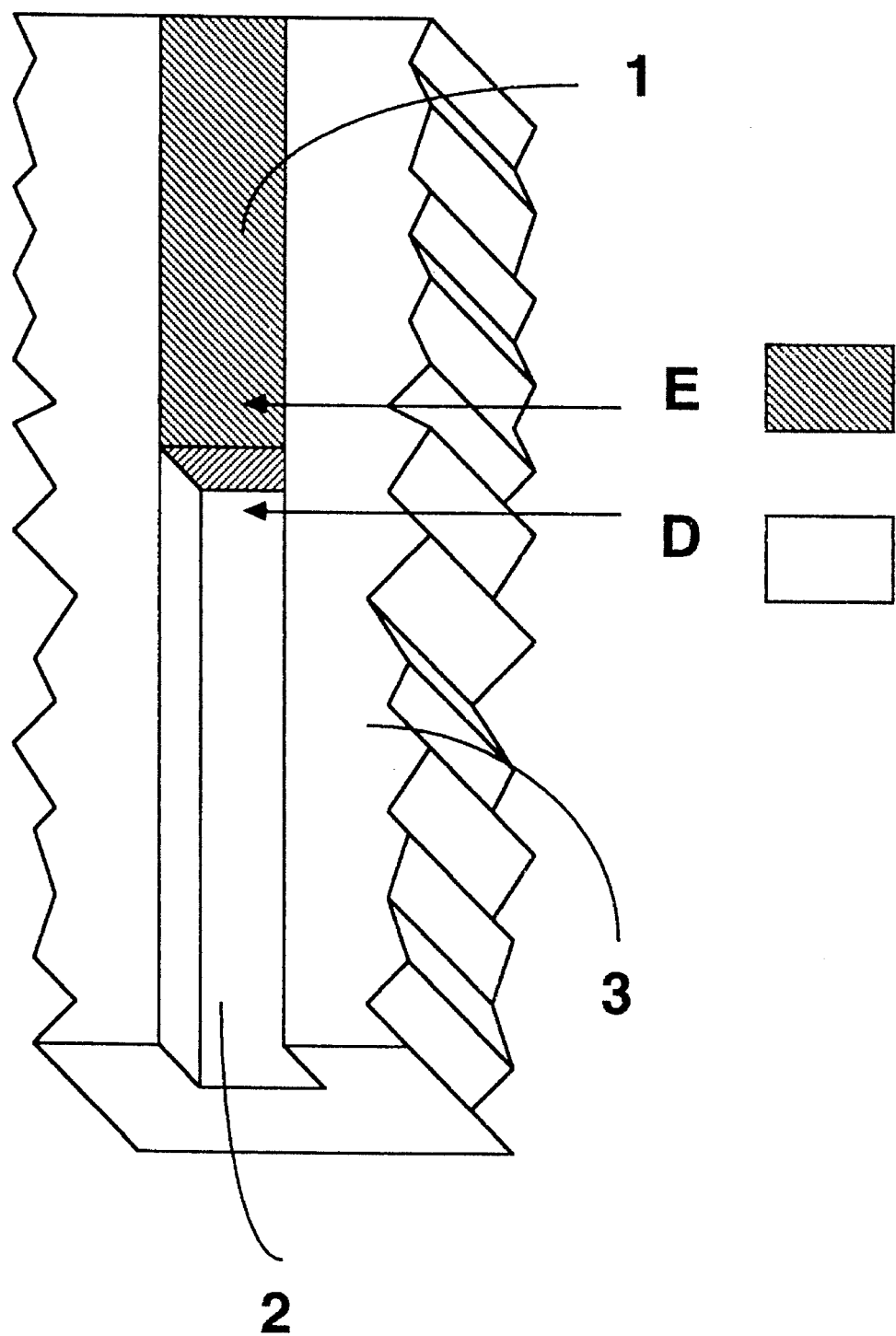
FIG. 1 shows in a schematic fashion a perspective view of an optical channel waveguide, and a hollow channel which is collinear extension of the channel waveguide. Also shown on the right are sectional view of the channel waveguide and that of the hollow channel at the two locations D and E.
Figure 2:
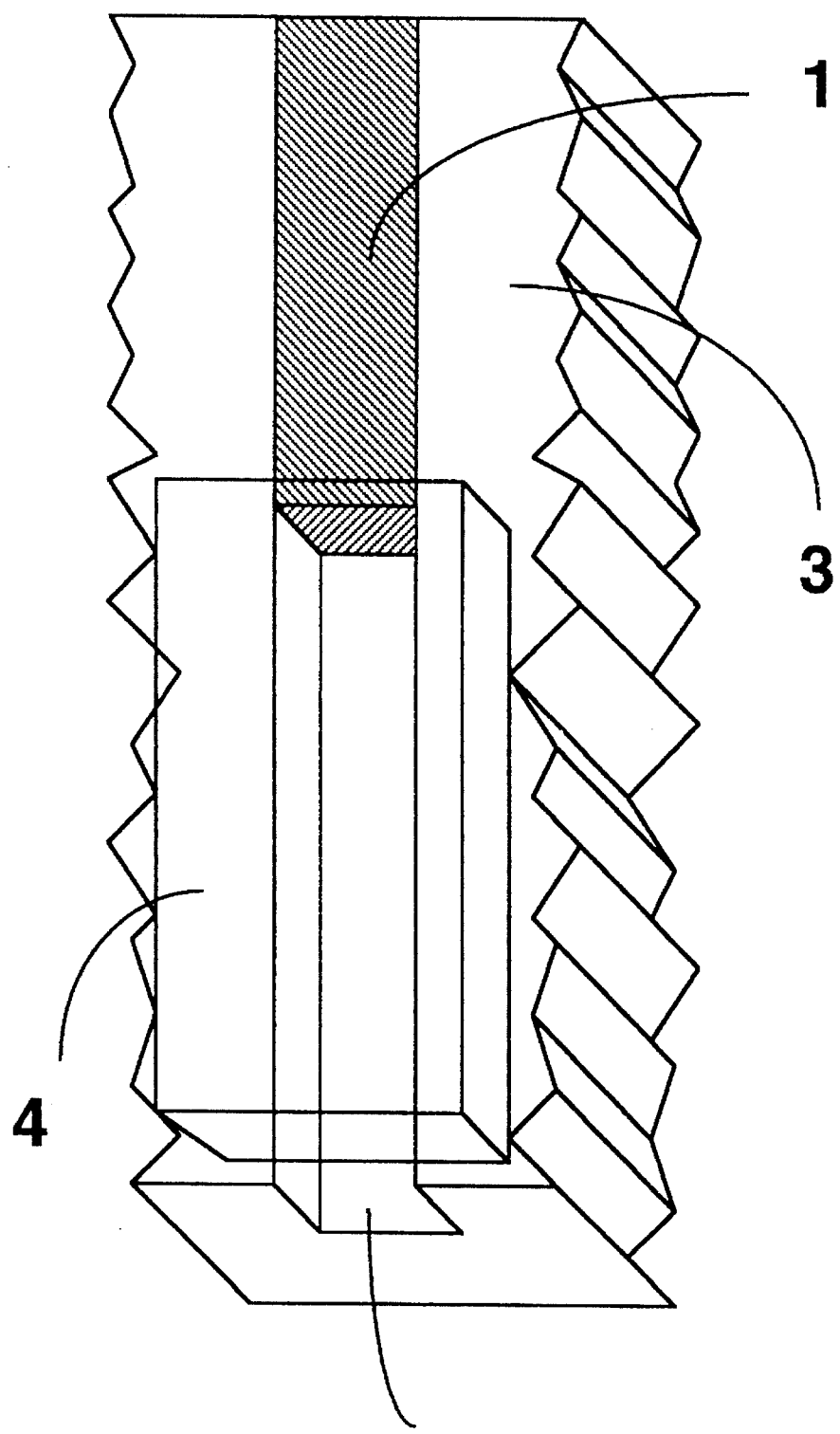
FIG. 2 shows the same as of FIG. 1, except that a cover slab is added over the hollow channel.

In FIG. 1 is shown a channel waveguide 1 and a hollow channel 2 fabricated on a substrate 3. The area and the shape of the cross-section of the channel waveguide 1 are substantially identical to those of the hollow channel 2. This point is indicated schematically by sectional views at location D and location E in FIG. 1. The sectional shapes do not have to be rectangular as shown. They can have any other shape, so long as the shapes and the areas are substantially same at the two locations D and E. Preferably, the channel waveguide 1 is made first by fabricating a hollow channel that extends through the channel waveguide 1 and the hollow channel 2, and then by filling up a part of the channel to form the channel waveguide 1. The photo-reactive polymer materials such as described in the parent patent are especially adequate for fabricating the hollow channel 2 and channel waveguide 1 as shown in FIG. 1. It is also possible to fabricate the embodiment of FIG. 1 by first fabricating a channel waveguide that extends through the channel waveguide 1 and the hollow channel 2, and then by etching the channel waveguide over a part of the length so as to create the hollow channel 2. The hollow channel 2 may be also made by a molding technique. This will be the least expensive way, and thus would be most suitable for a large-volume production. The hollow channel 2 is preferably covered on top with a cover slab 4 as shown in FIG. 2 so that the hollow channel 2 is enclosed on all four sides. The slab 4 may be the integral part of the substrate 3, or may be a removable one.

The channel waveguide 1 is for light guiding, and thus normally made of material with an index of refraction higher than that of the surroundings, namely, the substrate 3 and the medium on the top.

Figure 3:
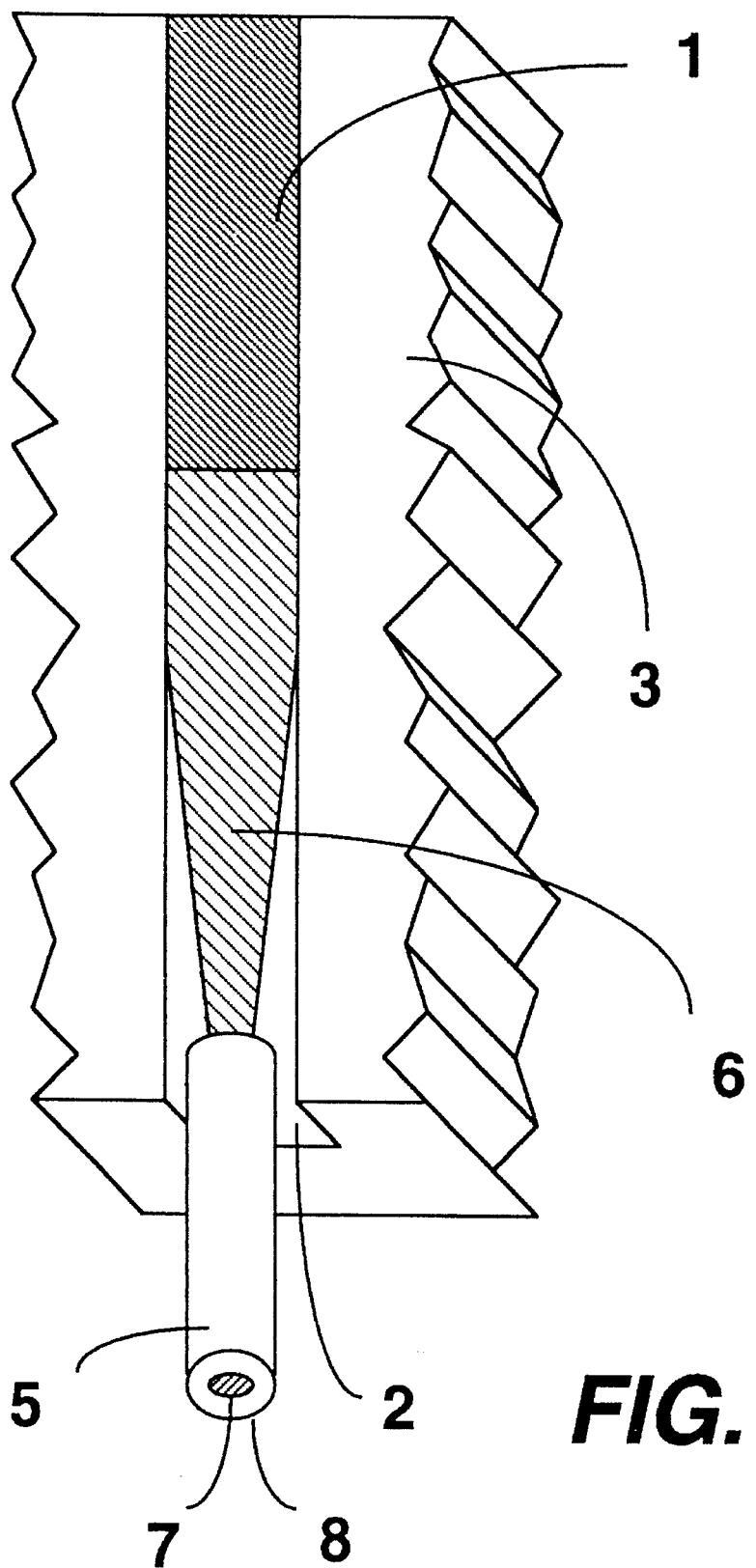
FIG. 3 shows the same as of FIG. 1, except that an optical fiber is added, and a core-extension of the optical fiber is created inside the hollow end-section.

FIG. 3 shows that an optical fiber 5 is placed in the hollow channel 2 of FIG. 1, and a core-extension 6 is formed on the output end facet of the core 7 in the manner as described in the parent patent. As described in "SUMMARY OF THE PRESENT INVENTION" of the parent patent, the index of refraction of the core-extension 6 is larger than that of the surrounding medium so that the light entering the core-extension 6 from the channel waveguide 1 with a proper input angle experiences the total internal reflection and is guided by the core-extension until it arrives and couples into the core 7. When light propagates in a tapered section with decreasing diameter, the incident angle becomes smaller (Note: In the optical geometry, the incident angle is defined as the angle between the light ray and the normal to the waveguide boundary. In the more accurate picture using waveguide theory, the incident angle is determined by taking the arc tangent of the ratio between the transverse component and the longitudinal component of the wavevector of a propagating eigenmode of the channel waveguide). When the taper length is too long and the taper angle too large, the incident angle of some light rays could become too small to experience the total internal reflection at some point along the taper. When this happens, these particular rays escape from the guiding structure. This effect can be reduced or even eliminated by making the taper angle small and the taper length shorter. When the taper angle is small enough, the so-called adiabatic process is achieved and light propagates without experiencing a loss, which would be caused by conversions from guided modes to unguided modes. Thus it is preferred to keep the taper angle of the core-extension 6 small. This can be achieved, while fabricating the core-extension 6 following the method taught in the parent patent, by limiting the UV light entering the fiber core 7 only to the lower order modes of the fiber. Also, as described in the parent patent, it helps to etch away the fiber cladding 6 as much as possible so that the core-extension 6 does not have to expand too much, and the core-extension angle does not have to be large to accomplish its interconnect function. In FIG. 2, this means etching away all or most of the cladding 8 from the fiber 5, and also making the width and the depth of the hollow channel 2 not much larger than the fiber 5.

The core-extension 6 may be made preferably of a material same as or similar to that of the channel waveguide 1 so that, after all the fabrication is done, there would not be any boundary between the core-extension 6 and the channel waveguide 1. This will also reduce the reflection loss and some other losses that would be caused by imperfect condition at the interface between the channel waveguide 1 and the core-extension 6.

Since the core-extension 6 diverges until it touches the walls of the hollow channel 2, the transition from the core 7 to the channel waveguide 1 is self-aligned and the interface is completely matched in the shape and the size. This will be further clarified in FIG. 4 through FIG. 8, which show schematically the sectional views of the embodiments shown in FIG. 1 through FIG. 3.

Figure 4:
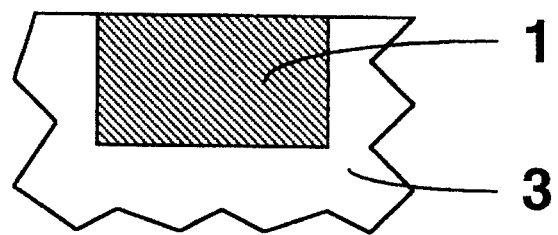
FIG. 4 shows a sectional view across the channel waveguide of the embodiment of FIG. 2.

FIG. 4 shows an enlarged sectional view of the channel waveguide 1 and the substrate 3 of FIG. 2 across the plane perpendicular to the light propagation direction. The medium above the channel waveguide 1 may be an air or some other optical material with an index of refraction lower than that of the channel waveguide 1.

Figure 5:
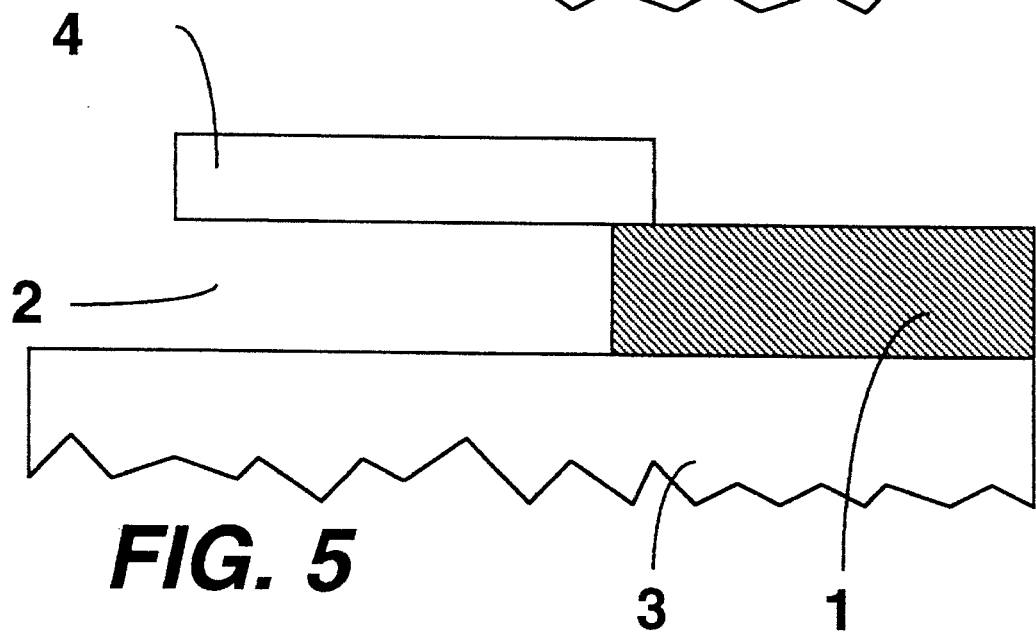
FIG. 5 shows the sectional side view of FIG. 1 along the channel.

FIG. 5 shows a sectional view of the channel waveguide 1, the substrate 3, and the cover slab 4 of FIG. 2 along the channel and in the plane orthogonal to the substrate surface. The cover slab 4 may be removably placed so that it can be removed after the core-extension 6 is fabricated. The cover slab 4 may not be needed if the material for the core-extension 6 is prepared to be flush with the substrate top surface before the core-extension 6 is formed by UV light exposure. In this case the uppermost contour of the core-extension would be shaped in the same manner as if the cover slab 4 were placed over the hollow channel 2.

Figure 6:
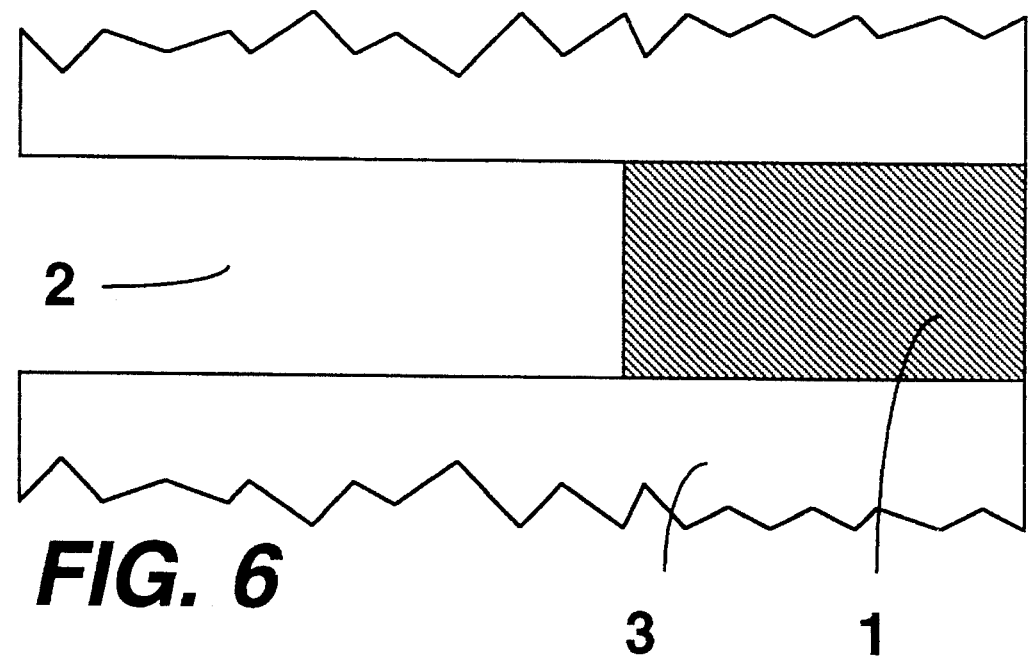
FIG. 6 shows the sectional plan view of FIG. 1 along the channel.

FIG. 6 shows a sectional view of the channel waveguide 1 and the substrate 3 of FIG. 2 along the channel and across the plane parallel to the substrate surface.

Figure 7:
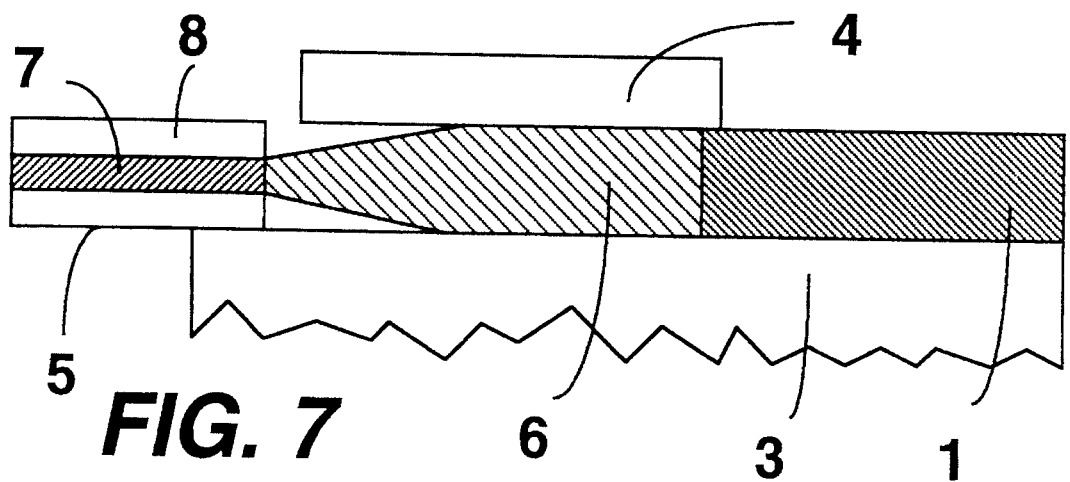
FIG. 7 shows the sectional side view of FIG. 3 along the channel.

FIG. 7 shows the same as in FIG. 5, except that a fiber 5 with the core 7 and the cladding 8, and the core-extension 6 are added. The core-extension 6 is fabricated according to the teaching of the parent patent. The cover slab 4 may be removed after the core-extension is fabricated.

Figure 8:
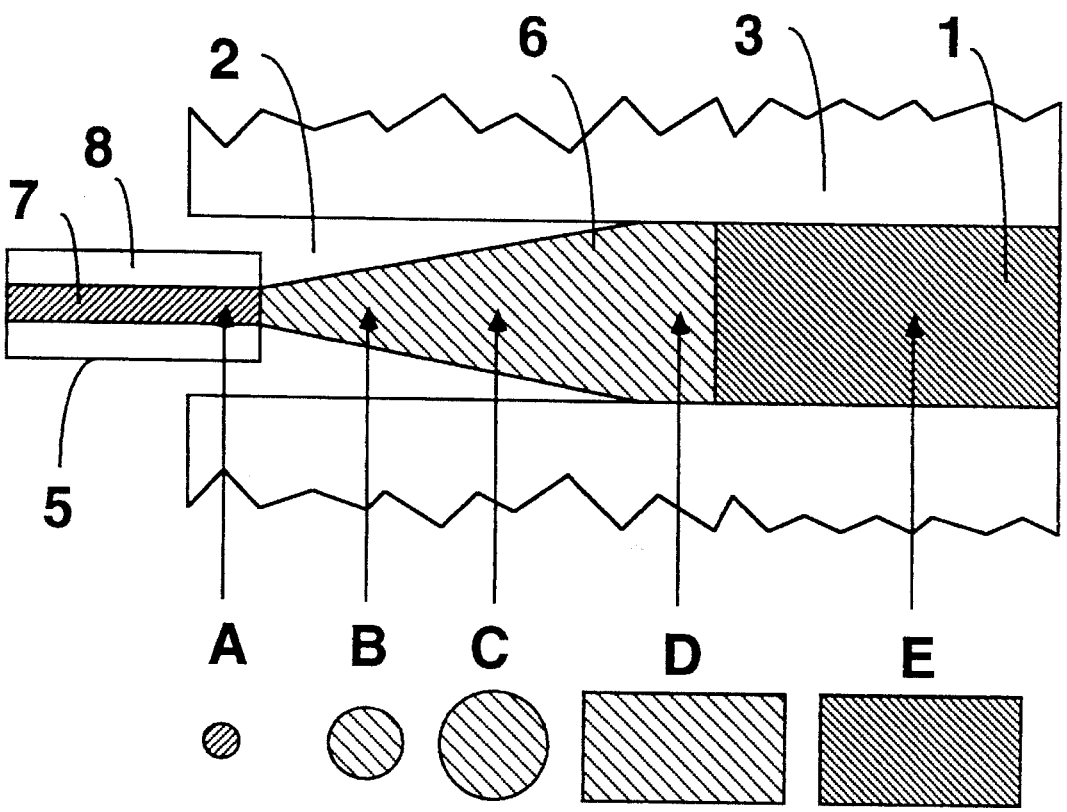
FIG. 8 shows the sectional plan view of FIG. 3 along the channel. Also shown are the sectional views of light guiding cores at the fiber core, various points of the core-extension, and then the channel waveguide.

FIG. 8 shows a sectional view seen from the direction orthogonal to that for FIG. 7. In other words, FIG. 8 is the same as in FIG. 6 except that the fiber 5 and its core-extension 6 are added. Also shown in FIG. 8 is a series of sectional views of light-guiding structure at locations from A through E, starting from the optical fiber core 7 to three locations within the core-extension 6, and finally the channel waveguide 1. Due to the nature of the diverging core-extension as described in the parent patent, the core-extension 6 fills up the internal space of the hollow channel 2.

Accordingly the shape as well as the area of the core-extension 6 matches that of the channel waveguide 1, as shown schematically. Again, the shape of the channel does not have to be rectangular as show, and can be any other shape, such as oval, circular, square, or any combination of these. This self-alignment and self-shape-matching would make the fiber interconnection much simpler and much cheaper.

Figure 9:
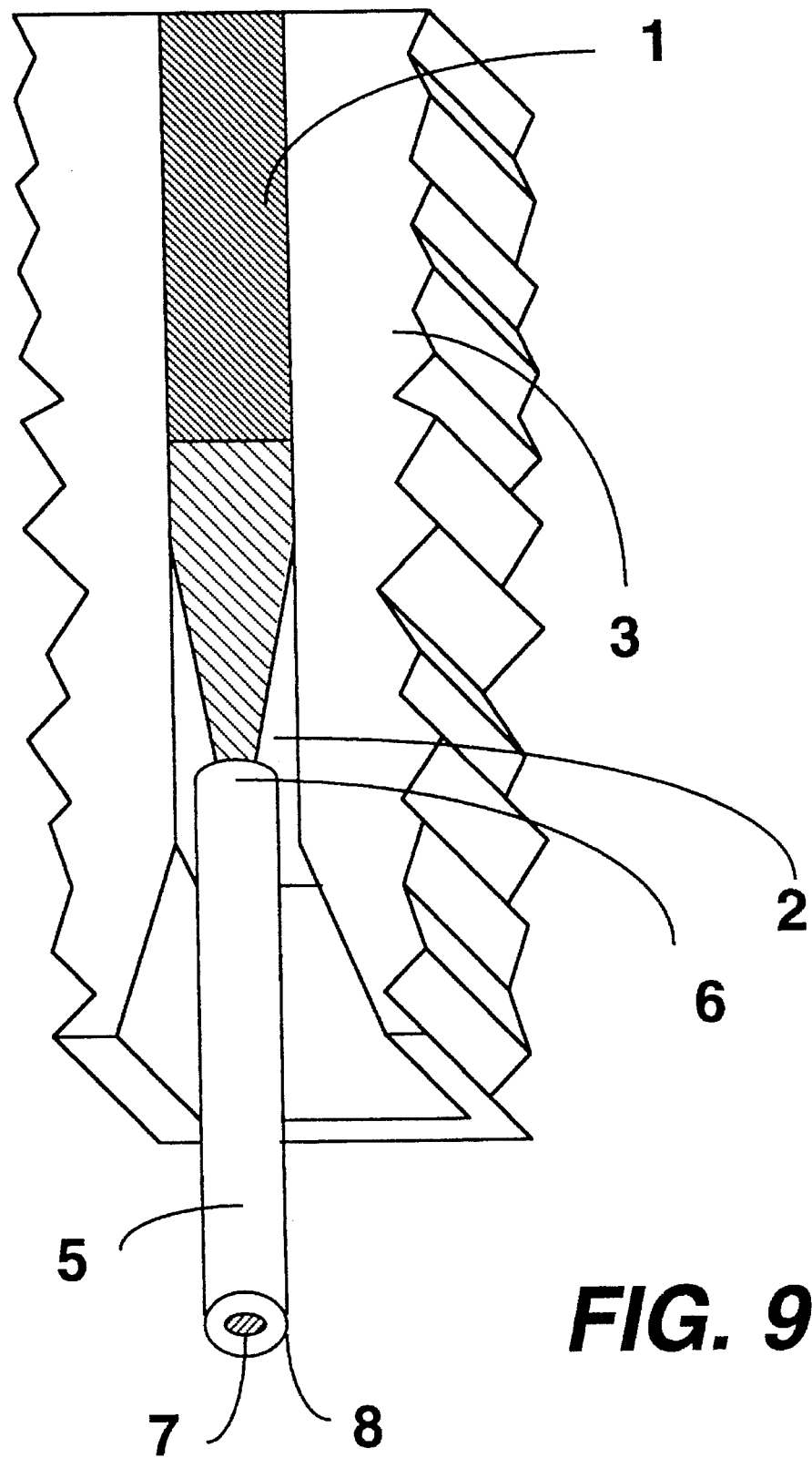
FIG. 9 is the same as of FIG. 3, except that the hollow channel is tapered out at the input end to aid the insertion of the fiber into the hollow channel.

FIG. 9 shows the same as that of FIG. 8, except that a tapered transition is added to the input end of the hollow channel 2 so as to ease the insertion of the optical fiber 5. Such an input transition may be added to all the embodiments described in the present invention disclosure.

Figure 10:
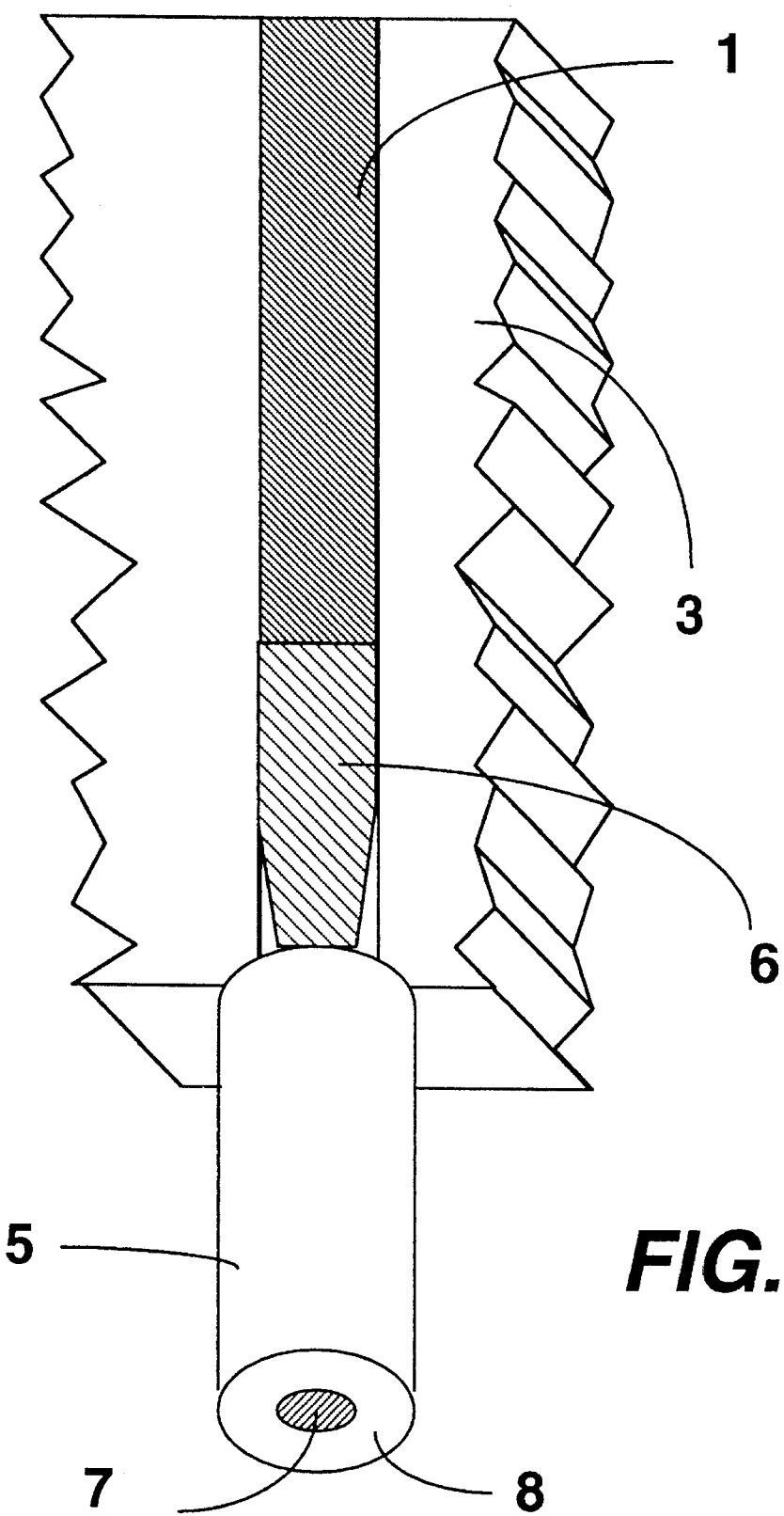
FIG. 10 shows the same as that of FIG. 3, except that the optical fiber is located entirely outside the hollow channel.
Figure 11:
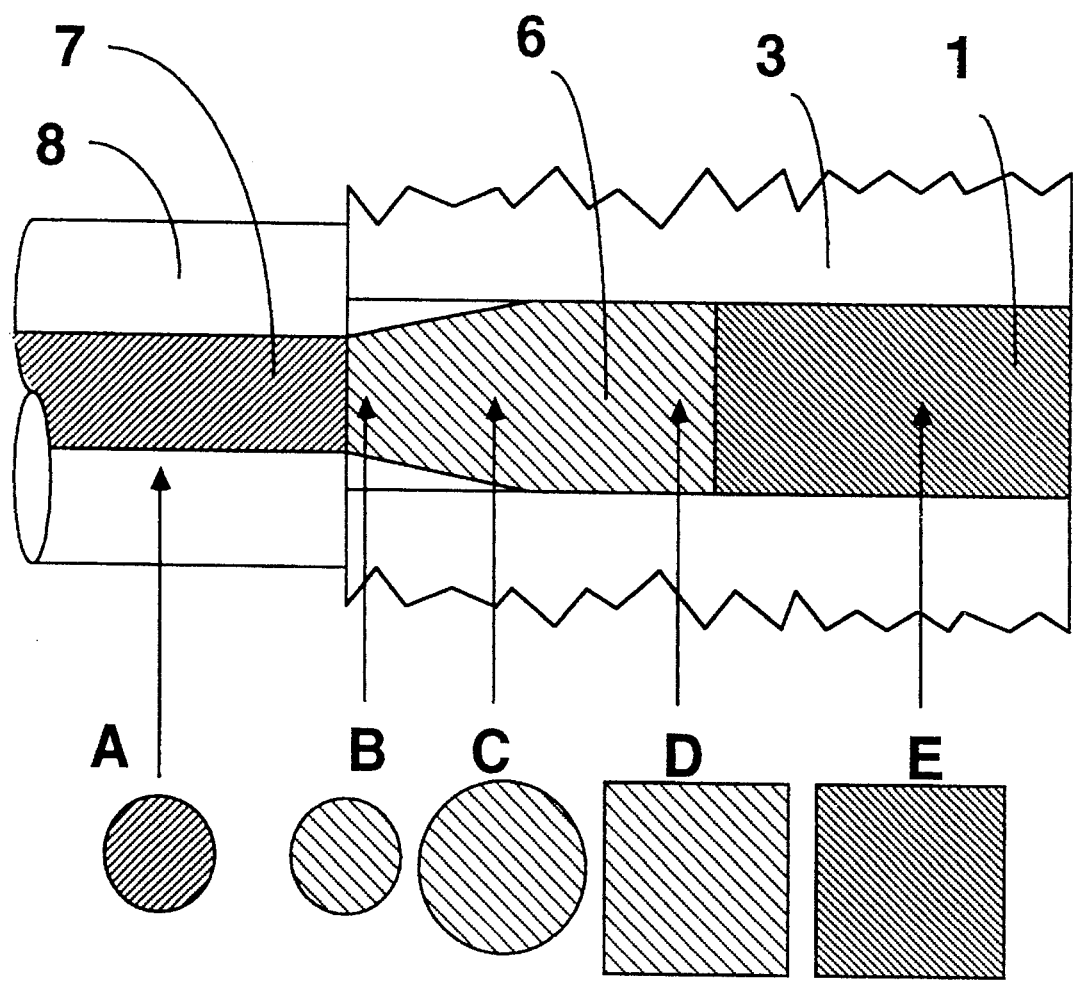
FIG. 11 shows the sectional plan view of FIG. 10 along the channel. Also shown are the sectional views of light guiding cores in the fiber, various points in the core-extension, and then the channel waveguide.

FIG. 10 shows a slight variation from FIG. 3 in that the fiber 5 is located entirely outside the hollow channel 2. This allows the width and depth of the hollow channel 2 to be only slightly larger than the diameter of the core 7, and yet less than the diameter of the cladding 8. Accordingly, the core-extension 6 does not have to diverge much before it can fill up the hollow channel 2. This is advantageous for reducing any possible mode-conversion loss that would incur when the taper is too fast or excessively long in the core-extension 6. FIG. 11 shows the evolution of the light beam along the embodiment of FIG. 10. All the embodiments described in this application may have the optical fiber 5 positioned in the fashion as shown in FIG. 10, instead of that as shown in FIG. 3 or FIG. 9, without altering the basic teaching of the present application.

In many applications there are more than one channel waveguide and more than one fiber involved with interconnection on a substrate. The embodiment shown in FIG. 3 can be applied to such a multi-channel case as shown in FIG. 12, in which two fibers 9 and 10 with two individual core-extensions 11 and 12, respectively, are connected to the two channel waveguides 13 and 14. At the opposite end is shown a mirror image with two core-extensions 15 and 16 connected to two fibers 17 and 18. Note that each of the core-extensions 11, 12, 15, and 16 is confined within the corresponding individual channel, and merges to the inner walls of the corresponding hollow channel. This contrasts to the coupler embodiments described in the parent patent, in which, whenever there are more than one fiber, the fibers are placed next to each other, and made to merge together among themselves through the core-extensions. The channel waveguides 13 and 14 may be optically isolated from each other, or coupled through the evanescent field coupling. The coupling may be controlled electrically if the waveguiding material has the electro-optic characteristics. In that case the light in one input fiber, for example the fiber 9, may be switched between one output fiber 17 and the other 18.

FIG. 13 shows the same situation as shown in FIG. 12, in which the multiple fibers 19 and 20 and corresponding core-extensions 21 and 22 are connected individually to channel waveguide 23 and 24, except that the channel waveguides 23 and 24 are shown to merge together toward the middle 25 to form a light coupling region. This again contrasts to the coupler embodiments shown in the parent patent in that in the present application, the core-extensions remain separate from each other and the coupling is made by tapered and merged channel waveguides, while in the parent patent the coupling is made directly through the core-extensions that merge together.

The embodiments and functions of channel waveguides 13, 14, 23 and 24 shown in FIG. 12 and FIG. 13 are commonly known in fiber optic field. Thus the present invention is not claiming any new teaching on the functions of the channel waveguides, such as the coupling functions of tapered channel waveguides in FIG. 13. What is new and novel is the optical fiber-to-channel waveguide interconnection embodiments. At this time the reality is that channel waveguides may be fabricated rather cheaply in a volume-production mode using photolithography and associated thin-film technology. The expensive part is the interconnection between channel waveguides and optical fibers. Accordingly, the interconnection method and embodiment disclosed in the present application could reduce the fiber optic component costs dramatically.

Another important class of optical fiber interconnection is demountable fiber connector. From the early days of fiber optic technology, there has been the recognition that the small size of the light beam being guided by optical fiber cores makes the connector design difficult and the cost high, and that expansion of the light beam size would make the connection easier. Ball lenses and graded-index rod lenses have been often used to expand beam. The beam should be expanded substantially to ease the connection operation. Beam diameter from less than 0.1 mm to larger than 1 mm would be desirable.

Figure 14:
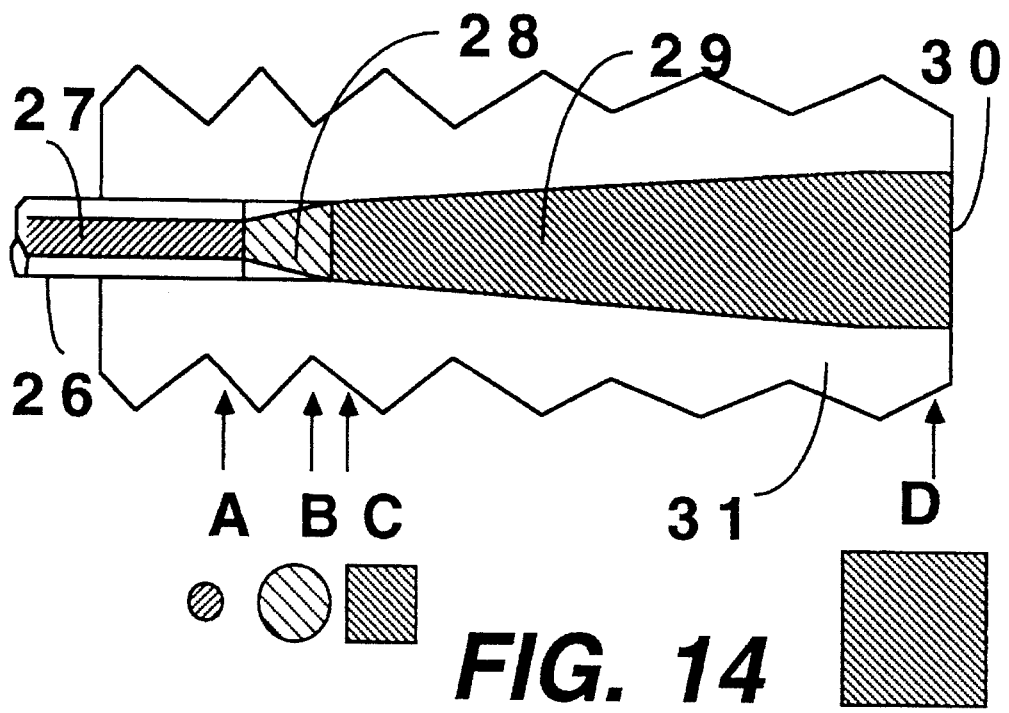
FIG. 14 shows the same as that of FIG. 3, except that the channel waveguide is tapered out to make the sectional area larger at the end. Also shown are the sectional views of the light guiding cores at the various points A through D.

In connecting one fiber to another using light beam expansion, it is important to make sure that the light divergence angle becomes smaller as the beam diameter becomes enlarged. This is because, when the beam size is reduced to the original size so as to be coupled to a mating fiber, the light divergence angle gets larger. Thus, unless the angle gets small enough in the enlargement process, it would become too large to experience the totally-reflection in the reduction process. In order to keep the taper angle small in an enlarged connector, an embodiment as shown in FIG. 14 is devised for a connector, which is basically the same as that shown in FIG. 8, except that the channel waveguide 29 is tapered out and terminated at the end 30 for light connection. The most of the tapering and enlargement is achieved by the channel waveguide 29, which can be precisely designed and fabricated. The core-extension 28 is only to connect conformably between the fiber core 27 and the channel waveguide 29. The sectional views of the light guiding media at the various locations A, B, C and D are shown in the lower part of FIG. 14. In this particular case the enlargement of the channel waveguide from the location C to D is a two-dimensional enlargement. The enlargement may be made only in one dimension. The enlargement from the location A to B could be very small by removing the most of the cladding layer 26 and by making the channel width at locations A and B very close to the diameter of the etched cladding.

Figure 15:
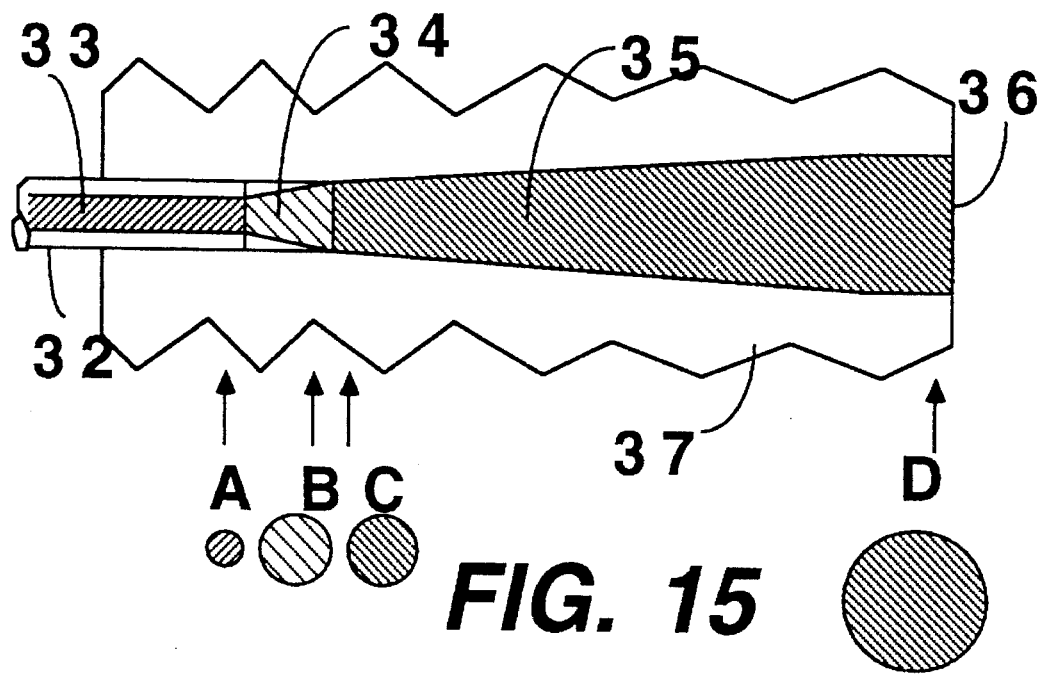
FIG. 15 shows the same as that of FIG. 13, except that the section of the channel has a circular shape.

FIG. 15 is the same as in FIG. 14, except that the channel waveguide 34 has a round sectional shape.

FIG. 16 shows schematically a perspective view of a connector, and its mating part, which would have a sectional view as shown in FIG. 14.

FIG. 17 shows schematically an embodiment of a connector which would have a sectional view as shown in FIG. 15.

FIG. 18 shows schematically another possible embodiment of the connector shown in FIG. 15.

Figure 19:
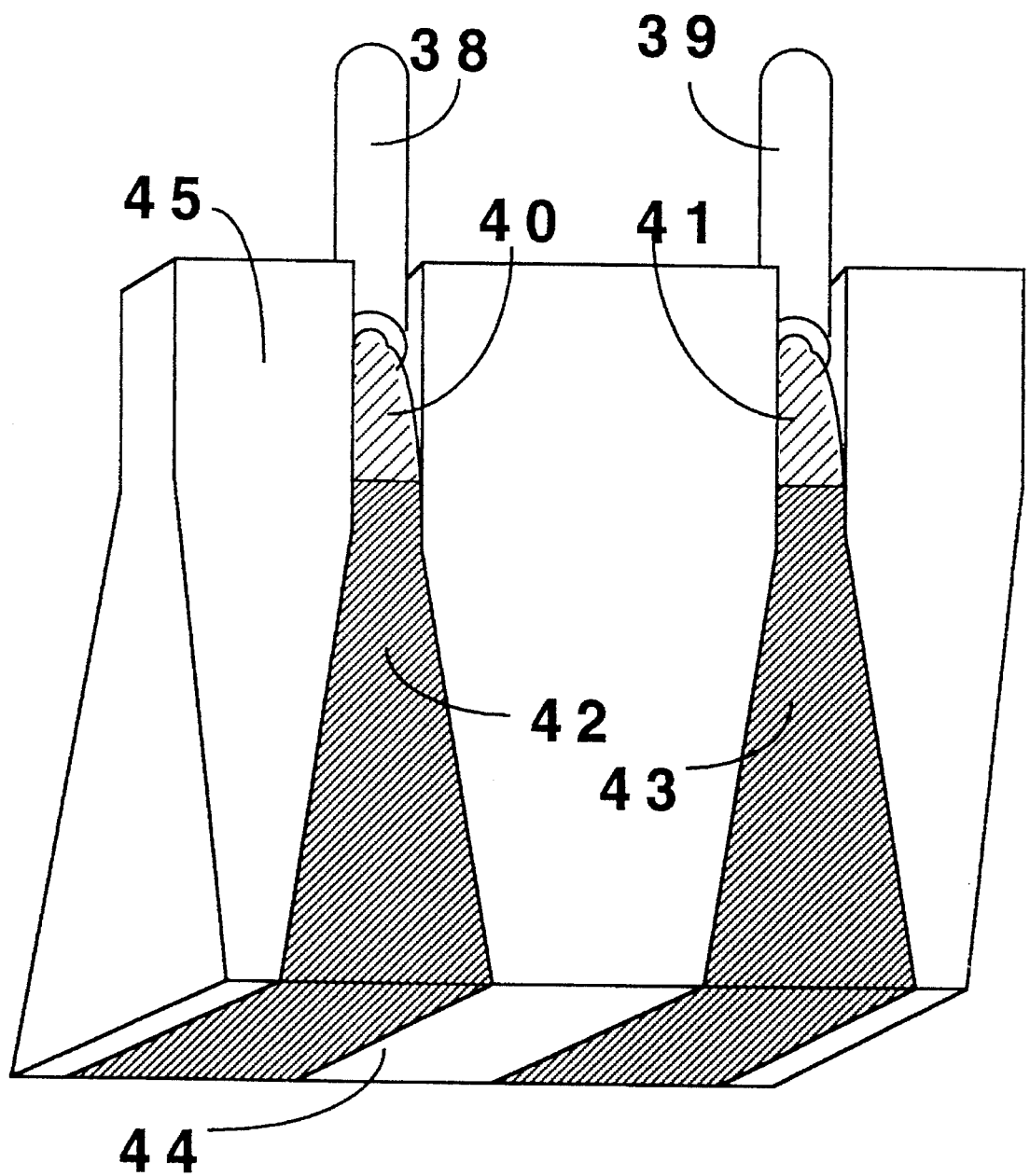
FIG. 19 shows the same as that of FIG. 16, except that there are two units of the fiber interconnection element instead of one, forming a multi-fiber array connector.

FIG. 19 shows an array of the connector shown in FIG. 16, in which two fibers 38 and 39 are individually connected to two separate, tapered channel waveguides 42 and 43 through two separate core-extensions 40 and 41, and terminated at a same end surface 44. This array connector is fabricated on a same substrate 45. The distance between the two guiding units can be precisely designed to achieve universal connection among array connectors of a same family. Even though only two units are shown in the array of FIG. 19, many more, such as 16, 32 or 64 units, can be fabricated on the same substrate 45.

Figure 20:
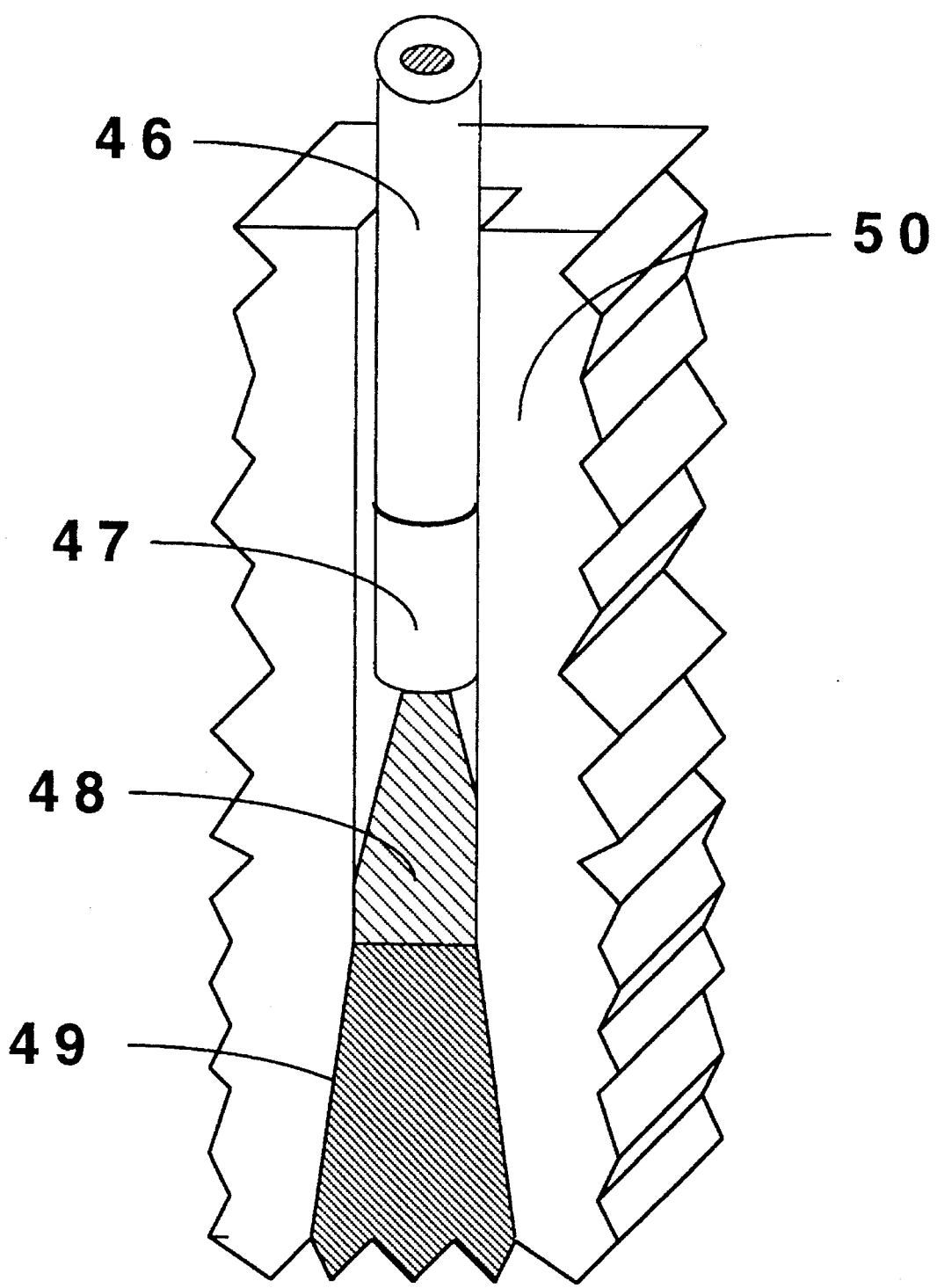
FIG. 20 shows the basically same embodiment as that of FIG. 14, except that the fiber is composed of two segments along the length.

FIG. 20 shows the basically same embodiment as shown in FIG. 14, except that the optical fiber 47 is short enough to be contained within the hollow channel, and a second fiber 46 is added as shown. After the core-extension 48 is formed following the teachings described in the parent patent, the second fiber 46 may be removed, with the resulting embodiment shown in FIG. 21. A new fiber may be brought in to replace the second fiber 46 interchangeably. Even the first fiber 47 may be removed, resulting in an embodiment shown in FIG. 22. In order to make the first fiber 47 removable, a thin coating could be applied on the end facet of the optical fiber 47 before the core-extension 48 is fabricated following the teaching of the parent patent. The thin coating should be made of a material that does not stick to the material of the core-extension 48. Possible materials with such non-sticking characteristics include silicon rubber and Teflon. The material could be also something that may be dissolved by an chemical that does not disturb other materials that make up the core-extension 48, the channel waveguide 49, or the ,substrate 50. The material could be a low-melting temperature material such as a wax. This feature, namely removal of the optical fiber, may be applied to other embodiments described in this application, such that shown in FIG. 3.

Figures 21, 22:
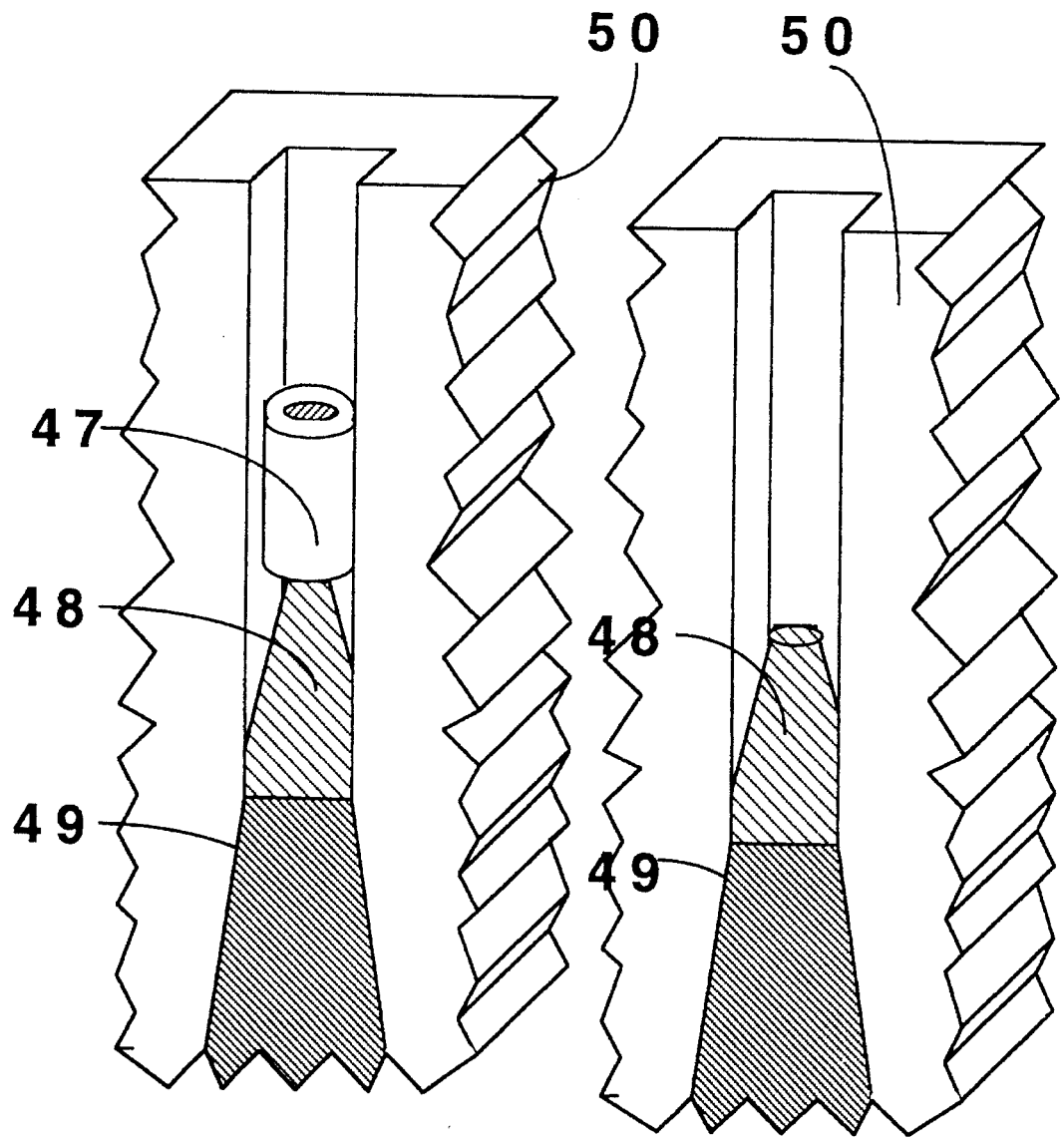
FIG. 21 shows the same as that of FIG. 20, except that one segment of the fiber has been removed.
FIG. 22 shows the same as that of FIG. 14 or FIG. 21, except that the optical fiber has been removed.
Figure 23:
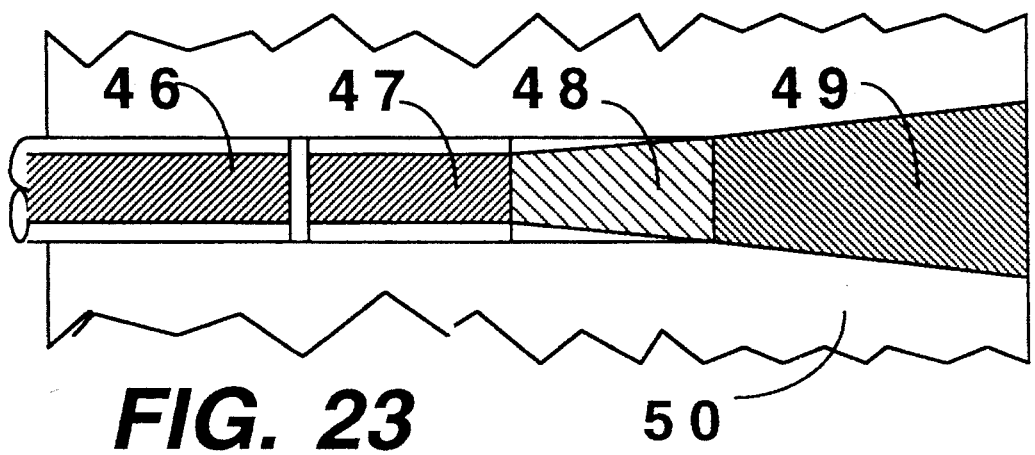
FIG. 23 shows a sectional view of FIG. 20 in the plane bisecting the fiber core and the channel waveguide.
Figure 24:
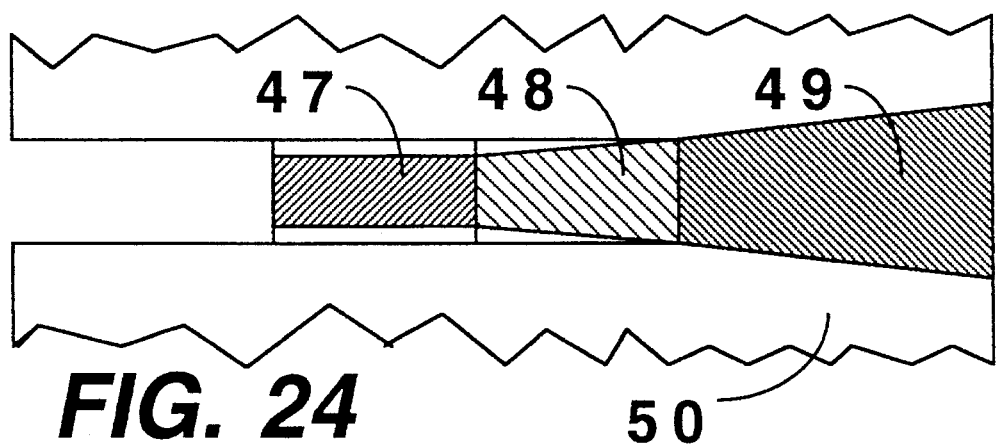
FIG. 24 shows a sectional view of FIG. 21 in the plane bisecting the fiber core and the channel waveguide.
Figure 25:
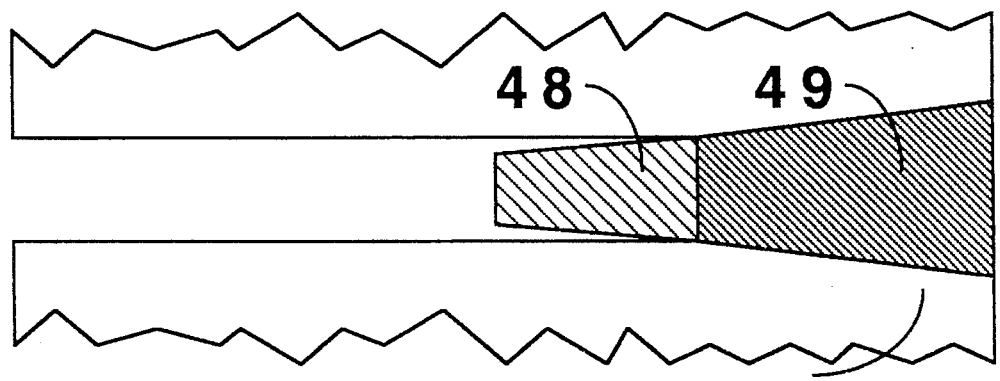
FIG. 25 shows a sectional view of FIG. 22 in the plane bisecting the channel waveguide.

FIGS. 23, 24 and 25 are sectional views corresponding the embodiments shown in FIGS. 20, 21, and 22.

Obviously many applications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical fiber interconnecting structure for connecting an optical fiber to an optical channel waveguide, comprising:

a hollow channel fabricated in an optical substrate;

a channel waveguide fabricated in the same optical substrate, and laid collinearly as an extension of the hollow channel, with the cross-sectional shape and area substantially identical to those of the hollow channel;

an optical fiber with a core and a cladding, laid collinearly in the hollow channel with its end facet facing the hollow channel; and a core-extension of the optical fiber residing inside the hollow channel and made of a photo-reactive material, the physical characteristics of which can be altered and shaped by a photo-exposure, and built on the end facet of the core following the shape of the diverging radiation pattern of light that stretches over a distance far enough to make the maximum diameter at the farthest end substantially larger than the core diameter, so as to allow the core-extension to make a physical contact with the walls of the hollow channel, and self-aligned with the core by formation of the core-extension by said radiation pattern of the light, and further having an index of refraction greater than that of the surrounding medium so as to possess light confining function;

whereby a light leaving the core of the fiber is coupled into the channel waveguide through the core-extension with a reduced loss and the shape and size of the core-extension is transformed gradually from the shape and size of the core of the optical fiber to the shape and size of the channel waveguide in the physical connection.

2. The invention according to claim 1 wherein the hollow channel is fabricated by a photolithography technique utilizing photo-reactive material.

3. The invention according to claim 1 wherein the hollow channel is fabricated by molding technique.

4. The invention according to claim 1 wherein the channel waveguide and the core-extension are made of the same material.

5. The invention according to claim 1 wherein the core is surrounded by a cladding the thickness of which is reduced locally so as to minimize the distance between the core and the wall of the hollow channel.

6. An optical fiber interconnecting structure for connecting an optical fiber to an optical channel waveguide comprising:

a hollow channel fabricated in an optical substrate;

a channel waveguide fabricated in the same optical substrate, and laid collinearly as an extension of the hollow channel, with the cross-sectional shape and area substantially identical to those of the hollow channel;

an optical fiber with a core and a cladding, laid collinearly with the hollow channel with its end facet facing the hollow channel; and a core-extension of the optical fiber that resides inside the hollow channel, interconnecting the core of the optical fiber to the channel waveguide;

whereby a light may be transmitted between the core of the fiber and the channel waveguide through the core-extension; and wherein the sectional area of the hollow channel is gradually enlarged as the distance from the channel waveguide increases, so as to ease the insertion of the optical fiber into the hollow channel.

7. The invention according to claim 1 wherein the fiber is entirely located outside the hollow channel, and the width and depth of the hollow channel is smaller than the diameter of the cladding and slightly larger than the diameter of the core of the optical fiber.

8. The invention according to claim 1 wherein the channel waveguide is tapered out to have a larger cross-section at a greater distance from the core-extension.

9. The invention according to claim 8 wherein the cross-section of the channel waveguide is enlarged in one dimension.

10. The invention according to claim 8 wherein the cross-section of the channel waveguide is enlarged in two dimensions.

11. The invention according to claim 8 wherein the enlarged cross-section has a square shape.

12. The invention according to claim 8 wherein the enlarged cross-section has a round shape.

13. The invention according to claim 1 wherein the optical fiber is removably placed inside the hollow channel.

14. An optical fiber interconnecting structure for connecting an optical fiber to an optical channel waveguide comprising:

a hollow channel fabricated in an optical substrate;

a channel waveguide fabricated in the same optical substrate, and laid collinearly as an extension of the hollow channel, with the cross-sectional shape and area substantially identical to those of the hollow channel;

an optical fiber with a core and a cladding, laid collinearly with the hollow channel with its end facet facing the hollow channel; and a core-extension of the optical fiber that resides inside the hollow channel, interconnecting the core of the optical fiber to the channel waveguide;

whereby a light may be transmitted between the core of the fiber and the channel waveguide through the core-extension; and wherein the optical fiber is placed inside the hollow channel and is short enough to be contained within the hollow channel so as to allow a second optical fiber to be releasably connected to the optical fiber in an end-butted fashion inside the hollow channel.

15. An arrayed optical fiber interconnecting structure for connecting an array of optical fibers to an array of optical channel waveguides in one-to-one fashion, comprising:

an array of hollow channels fabricated in an optical substrate;

an array of channel waveguides fabricated in the same optical substrate with each of the channel waveguides mated with one of the hollow channels in one-to-one fashion, and each of the channel waveguides laid collinearly as an extension of the corresponding hollow channel, with the cross sectional shape and the area of each of the channel waveguides substantially identical to the cross sectional shape and the area of the corresponding hollow channel;

an array of optical fibers with a core and a cladding, with one of the optical fibers assigned to one of the hollow channels in one-to-one fashion, with each optical fiber laid collinearly in the corresponding hollow channel with its end facet facing the corresponding hollow channel; and an array of core-extensions of the optical fibers, with one of the core-extensions assigned to one of the optical fibers in one-to-one fashion, with each core-extension residing inside the corresponding hollow channel and made of a photo-reactive material, the physical characteristics of which can be altered and shaped by a photo-exposure, and built on the end facet of the core following the shape of the diverging radiation pattern of light that stretches over a distance far enough to make the maximum diameter at the farthest end substantially larger than the core diameter, so as to allow the core-extension to make a physical contact with the walls of the hollow channel, and self-aligned with the core by formation of the core-extension by said radiation pattern of the light, and further having an index of refraction greater than that of the surrounding medium so as to possess light confining function;

whereby a light leaving the core of any of the optical fibers is coupled into the corresponding channel waveguide through the corresponding core-extension with a reduced loss and the shape and size of the core-extension is transformed gradually from the shame and size of the core of the optical fiber to the shape and size of the channel waveguide in the physical connection.

16. The invention according to claim 15 wherein the hollow channels are fabricated by a photolithography technique utilizing photo-reactive material.

17. The invention according to claim 15 wherein the hollow channels are fabricated by molding technique.

18. The invention according to claim 15 wherein the channel waveguides have evanescent-field coupling with neighboring channel waveguides.

19. The invention according to claim 15 wherein the channel waveguides are tapered out in the width so as to merge with the neighboring channel waveguides for optical coupling.

20. The invention according to claim 15 wherein the channel waveguides are tapered out to have a larger cross-section at a greater distance from the core-extensions, but still separated from the neighboring channel waveguides.

21. The invention according to claim 20 wherein the ends of the tapered channel waveguides are terminated by one common end facet that is substantially orthogonal to the orientation of the channel waveguides, so as to form a demountable end-butt light connection interface with another optical components.

22. The invention according to claim 1, wherein the divergence angle of the core-extension is substantially smaller than the maximum possible divergence angle of optical rays radiating from the core, so as to minimize the loss of a light propagating through the core-extension.

* * * * *